United States Patent
Sato

(10) Patent No.: US 7,657,593 B2
(45) Date of Patent: Feb. 2, 2010

(54) IMAGE PROCESSING SYSTEM, IMAGE PROCESSING METHOD, IMAGE PROCESSING APPARATUS, PROGRAM FOR IMPLEMENTING THE METHOD, AND STORAGE MEDIUM

(75) Inventor: Tomoya Sato, Kanagawa (JP)

(73) Assignee: Canon Kabushiki Kaisha (JP)

( * ) Notice: Subject to any disclaimer, the term of this patent is extended or adjusted under 35 U.S.C. 154(b) by 1092 days.

(21) Appl. No.: 10/994,641

(22) Filed: Nov. 22, 2004

(65) Prior Publication Data
US 2005/0114767 A1  May 26, 2005

(30) Foreign Application Priority Data
Nov. 21, 2003  (JP) .............................. 2003-392378

(51) Int. Cl.
*G06F 15/16* (2006.01)
(52) U.S. Cl. ...................... 709/203; 709/223; 709/224; 358/434
(58) Field of Classification Search ................. 709/222, 709/223, 203; 358/434
See application file for complete search history.

(56) References Cited

U.S. PATENT DOCUMENTS

| | | | | |
|---|---|---|---|---|
| 6,456,400 | B1 * | 9/2002 | Ikegami et al. ............... | 358/434 |
| 6,701,384 | B1 * | 3/2004 | Fukuta ........................... | 710/5 |
| 7,016,755 | B2 * | 3/2006 | Abuku ........................... | 700/121 |
| 7,028,081 | B2 * | 4/2006 | Kawashima ................ | 709/223 |
| 2002/0105677 | A1 | 8/2002 | Sato | |

FOREIGN PATENT DOCUMENTS

| | | |
|---|---|---|
| JP | 2002-333967 A | 11/2002 |
| JP | 2003-44375 A | 2/2003 |
| JP | 2003-141299 A | 5/2003 |

OTHER PUBLICATIONS

Japanese Office Action, mailed on Sep. 25, 2007, in corresponding JP application:2003-392378.

* cited by examiner

*Primary Examiner*—Vivek Srivastava
*Assistant Examiner*—Adnan Mirza
(74) *Attorney, Agent, or Firm*—Rossi, Kimms & McDowell LLP

(57) ABSTRACT

An image processing system which is capable of easily customizing a user interface to be displayed on a client computer, according to user's intended use, preference, and/or the like. An image processing apparatus 101 is operable when receiving an operating request from a web client 120, to perform processing corresponding to the received operating request, and transmits to the web client 120 a redirect instruction for commanding access to a display processing service web server 110 as a response to the operating request. The web client 120 is operable when receiving the redirect instruction from the image processing apparatus 101, to access the display processing service web server 110 according to the received redirect instruction. The display processing service web server 110 is operable when being accessed from the web client 120 according to the redirect instruction, to transmit information for display according to a request from the web client 120, to the web client 120.

9 Claims, 13 Drawing Sheets

| REQUEST | TRANSFER DESTINATION FOR DISPLAY PROCESSING |
|---|---|
| print.cgi | print_result |
| send.cgi | send_result |
| ⋮ | ⋮ |

IMAGE PROCESSING SYSTEM, IMAGE PROCESSING METHOD, IMAGE PROCESSING APPARATUS, PROGRAM FOR IMPLEMENTING THE METHOD, AND STORAGE MEDIUM

BACKGROUND OF THE INVENTION

1. Field of the Invention

The present invention relates to an image processing system in which an image processing apparatus, a client, and a server for a display processing service are connected to a network, and to an image processing method, an image processing apparatus, a program for implementing the method, and a storage medium storing the program.

2. Description of the Related Art

In a network system in which an image processing apparatus which is provided with a web server function and a host computer are connected together, and in which the HTTP (HyperText Transfer Protocol) is used as a protocol between the image processing apparatus and the host computer, there has been used a known method in which information on the status of the image processing apparatus, information on its configuration, information on the status of a job which has been submitted to the image processing apparatus, background information, and other information are transmitted as HTML (HyperText Markup Language)documents from the image processing apparatus, so that the HTML documents can be read or viewed on the host computer using a web browser.

A web browser is a program which interprets HTML documents which are transmitted according to the HTTP, and performs display thereof, and is implemented on many host computers of various different types. Therefore, the web browser can easily implement a system, without any dependence on the type of the host computer. Further, the HTTP is a one-to-many multi client protocol, and it provides a user interface with which a plurality of users can interact with an apparatus at the same time.

For an image processing apparatus of the type described above, there is a demand to customize a user interface to be displayed on a client computer according to a user's preference or the intended application.

Furthermore, as a method for customizing a user interface to be displayed on a client computer, a method has been proposed, which includes storing a portion of image data as image files on a hard disk of the client computer in advance, and writing link data for linking to these image files stored on the client computer in a HTML document (for example, refer to Japanese Laid-Open Patent Publication (Kokai) No. 2003-44375).

However, in an image processing apparatus of the type described above, data which are sent to the web browser (including HTML files and image files) are stored in advance on a storage unit within the image processing apparatus. There also exist many systems which dynamically generate data to be transmitted using technology such as CGI (Common Gateway Interface) or Servlet. These systems employ essentially the same method as described above in which data for display are generated from data which are stored in advance on a storage unit within an image processing apparatus and transmitted. Therefore, with the image processing apparatuses of these systems, to customize a user interface to be displayed on a client computer, it is necessary to change the data stored on the storage unit within the image processing apparatus, and the user interface customization is thus difficult to perform with ease.

Furthermore, according to the method described in Japanese Laid-Open Patent Publication (Kokai) No. 2003-44375, it is possible to customize the user interface to be displayed for each user. However, it is necessary to store the files such as the image data on the hard disks of all the client computers in advance, which involves a very great deal of work in the storing operation. Still further, the data that can be customized are limited to data such as image data, and therefore it is difficult to fully meet customization requirements from users.

SUMMARY OF THE INVENTION

It is an object of the present invention to provide an image processing system, an image processing method, an image processing apparatus, and a program for implementing the method, which are capable of easily customizing a user interface to be displayed on a client computer, according to user's intended use, preference, and/or the like, and a storage medium storing the program.

To attain the above object, in a first aspect of the present invention, there is provided an image processing system, comprising an image processing apparatus, a display processing service server, and at least one client that is connected to at least the image processing apparatus and the display processing service server for communication therewith, and the image processing apparatus comprises a processing unit operable when receiving an operating request from the client, to perform processing corresponding to the received operating request, and a transmission unit that transmits to the client a redirect instruction for commanding access to the display processing service server as a response to the operating request, the client comprises an access unit operable when receiving the redirect instruction from the image processing apparatus, to access the display processing service server according to the received redirect instruction, and the display processing service server comprises a transmission unit operable when being accessed from the client according to the redirect instruction, to transmit information for display according to a request from the client, to the client.

Preferably, the redirect instruction includes the result of the processing corresponding to the operating request received by the image processing apparatus.

More preferably, the display processing service server comprises a display information storage unit that stores a plurality of items of information for display, and the display processing service server reads out information for display from the display information storage unit according to the result of the processing corresponding to the operating request received by the image processing apparatus included in the redirect instruction, and transmits the read out information for display to the client.

Preferably, the image processing apparatus comprises an address information storage unit that stores address information of the display processing service server and the redirect instruction is an instruction including address information stored in the address information storage unit.

Preferably, the client is capable of transmitting address information of the display processing service server along with the operating request when transmitting the operating request to the image processing apparatus, and the image processing apparatus is operable when receiving the address information transmitted along with the operating request from the client, to cause the transmission unit to transmit the redirect instruction including the received address information to the client.

More preferably, the image processing apparatus comprises a screen display information storage unit that stores screen information for display corresponding to the operating request from the client, and the image processing apparatus is operable when not receiving the address information of the display processing service server along with the operating request from the client, to cause the transmission unit to transmit to the client the screen information for display according to the operating request from the client stored in the screen display information storage unit, instead of the redirect instruction.

To attain the above object, in a second aspect of the present invention, there is provided an image processing method applied to an image processing system which comprises an image processing apparatus, at least one client, and a display processing service server, and in which the client is connected to at least the image processing apparatus and the display processing service server for communication therewith, comprising the steps of performing processing corresponding to an operating request from the client by the image processing apparatus when the operating request from the client is received by the image processing apparatus, transmitting a redirect instruction for commanding access to the display processing service server as a response to the operating request from the image processing apparatus to the client, accessing the display processing service server according to the redirect instruction by the client when the redirect instruction from the image processing apparatus is received by the client, and transmitting information for display according to a request from the client when the display processing service server is accessed from the client according to the redirect instruction.

Preferably, the redirect instruction includes the result of the processing corresponding to the operating request received by the image processing apparatus.

More preferably, the display processing service server comprises a display information storage unit that stores a plurality of items of information for display, and the display processing service server reads out information for display from the display information storage unit according to the result of the processing corresponding to the operating request received by the image processing apparatus included in the redirect instruction, and transmits the read out information for display to the client.

Preferably, the image processing apparatus comprises an address information storage unit that stores address information of the display processing service server and the redirect instruction is an instruction including address information stored in the address information storage unit.

Preferably, the client is capable of transmitting address information of the display processing service server along with the operating request when transmitting the operating request to the image processing apparatus, and the image processing apparatus is operable when receiving the address information transmitted along with the operating request from the client, to transmit the redirect instruction including the received address information to the client.

More preferably, the image processing apparatus comprises a screen display information storage unit that stores screen information for display. corresponding to the operating request from the client, and the image processing apparatus is operable when not receiving the address information of the display processing service server along with the operating request from the client, to transmit to the client the screen information for display according to the operating request from the client stored in the screen display information storage unit, instead of the redirect instruction.

To attain the above object, in a third aspect of the present invention, there is provided an image processing apparatus which is connected to at least one client capable of communicating with a display processing service server, for communication with the client, comprising a processing unit operable when receiving an operating request from the client, to perform processing corresponding to the received operating request, and a transmission unit that transmits to the client a redirect instruction for commanding access to the display processing service server as a response to the operating request.

To attain the above object, in a fourth aspect of the present invention, there is provided an image processing method applied to an image processing apparatus connected to at least one client capable of communicating with a display processing service server, for communication with the client, comprising the steps of receiving an operating request from the client, performing processing corresponding to the received operating request, and transmitting to the client a redirect instruction for commanding access to the display processing service server as a response to the operating request.

To attain the above object, in a fifth aspect of the present invention, there is provided a program for causing a computer to implement an image processing method applied to an image processing apparatus connected to at least one client capable of communicating with a display processing service server, for communication with the client, and the image processing apparatus performing processing corresponding to an operating request received from the client, the program comprising a control module for providing control to transmit to the client a redirect instruction for commanding access to the display processing service server as a response to the operating request received from the client.

To attain the above object, in a sixth aspect of the present invention, there is provided a computer-readable storage medium storing a program as claimed in the fifth aspect of the present invention.

According to the present invention, even if the image processing apparatus sends a response indicative of the same result of processing corresponding to an operating request from the client, it is possible to change the information for display transmitted from the display processing service server to the client according to the redirection instruction containing the response from the image processing apparatus, to thereby change the information which is displayed on the client. As a result, it is possible easily to customize the user interface which is displayed on the client according to user's intended use, preference, and/or the like.

Furthermore since, when an operating request is performed from the client to the image processing apparatus, it is possible to transmit address information of the display processing service server to the image processing apparatus along with the operating request, accordingly, if there are a plurality of clients, it is possible easily to customize the user interface for each of these clients.

The above and other objects, features, and advantages of the invention will become more apparent from the following detailed description taken in conjunction with the following drawings.

DETAILED DESCRIPTION OF THE PREFERRED EMBODIMENTS

The present invention will now be described in detail below with reference to the drawings showing preferred embodiments thereof.

Figure 1:
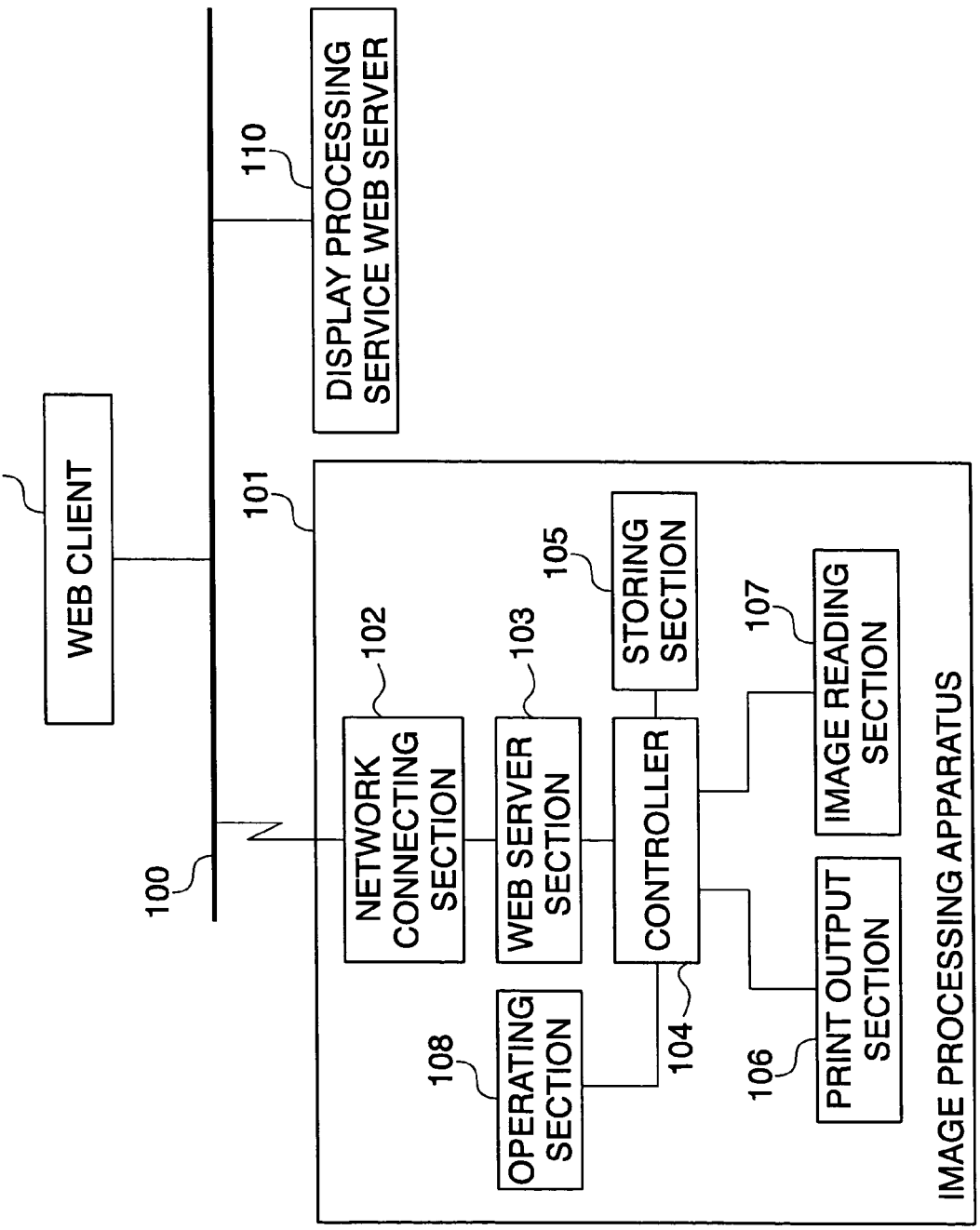
FIG. 1 is a block diagram schematically showing the construction of an image processing system which includes an image processing apparatus according to a first embodiment of the present invention.

FIG. 1 is a block diagram schematically showing the construction of an image processing system which includes an image processing apparatus according to a first embodiment of the present invention.

As shown in FIG. 1, the image processing system according to the present embodiment is comprised of an image processing apparatus 101, a display processing service web server 110, and a web client 120, these components being connected to each other via a network (communication medium), for example a LAN (Local Area Network) 100. The image processing apparatus 101 is comprised of a network connecting section 102, a web server section 103, a controller 104, a storage section 105, a print output section 106, an image reading section 107, and an operating section 108. The image processing apparatus 101 is implemented by a copying machine. The display processing service web server 110 is capable of communicating via the HTTP, which is generally in wide use. The web client 120 is implemented by, for example, a personal computer, and is comprised of an input section which inputs operations by a user, a communication section which communicates with the image processing apparatus 101 and the display processing service web server 110 according to operations by the user which are inputted from the input section, and a display section which displays information which has been sent from the image processing apparatus 101 and the display processing service web server 110.

Although in FIG. 1, a system is shown in which one each of the image processing apparatus, the display processing service web server, and the web client are connected to the network 100, the present invention may be applied to a system in which a plurality of image processing apparatuses, a plurality of display processing service web servers, and a plurality of web clients are connected to the network 100.

In the image processing apparatus 101, the network connecting section 102 performs transmission and reception of data with the web client 120 via the LAN 100. The web server section 103 is a server which can communicate via the HTTP, and operates according to requests from the web client 120. The storage section 105 stores various types of data such as image data, setup information for the image processing apparatus 101, and the controller 104 writes in and reads out various types of data such as image data into and from the storage section 105. The print output section 106 performs print output operations of forming images on sheets and outputting the images under the control of the controller 104. The image reading section 107 reads images from originals which have been loaded into the image processing apparatus 101, and outputs image data obtained by the reading to the controller 104. The operating section 108 is comprised of various keys, such as keys for inputting numerical values including the number of copies, and keys for mode setting. When each one of these various keys is operated, information corresponding to the operated key is outputted to the controller 104. Furthermore, the operating section 108 includes a display panel, not shown, which displays various set values for the image processing apparatus 101, the status of the image processing apparatus 101, and so on.

The controller 104 operates according to requests received from the web client 120 via the web server section 103, to provide control to send image data which is stored in the storage section 105 to the print output section 106 for print output thereof, output image data read from originals by the image reading section 107 to the print output section 106 for print output thereof, and store image data read from originals by the image reading section 107 in the storage section 105, for example.

Figure 2:
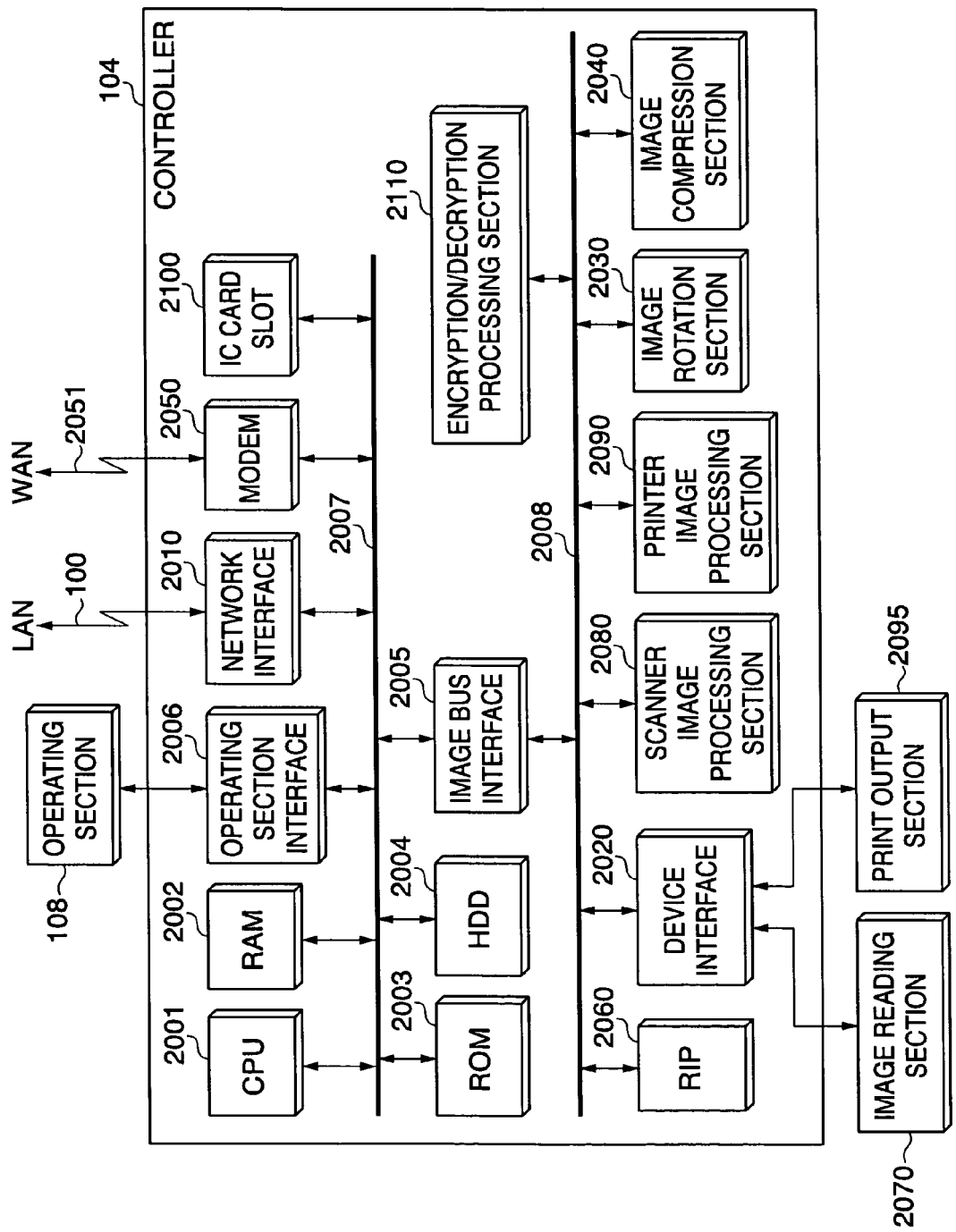
FIG. 2 is a block diagram schematically showing the construction of a controller of the image processing apparatus in FIG. 1.

Next, the construction of the controller 104 of the image processing apparatus 101 in FIG. 1 will be described with reference to FIG. 2. FIG. 2 is a block diagram schematically showing the construction of the controller 104 of the image processing apparatus 101.

As shown in FIG. 2, the controller 104 is connected to the image reading section 107 and the print output section 106 to control them, while it is connected to the LAN 100 and/or a WAN (public network) 2051 to control input and output of image information and/or device information via the same.

The controller 104 has a CPU (Central Processing Unit) 2001, which is connected, via a system bus 2007, to a RAM (Random Access Memory) 2002, a ROM (Read Only Memory) 2003, a HDD (hard disk device) 2004, an image bus interface 2005, an operating section interface 2006, a network interface 2010, a modem 2050, and an IC card slot 2100.

The RAM 2002 is a memory for providing a working area for the CPU 2001, and is also used as an image memory for temporarily storing image data. The ROM 2003 is a boot ROM, in which a system boot program is stored. The HDD 2004 stores system software, image data and the like. Here, the HDD 2004 constitutes the storage section 105 shown in FIG. 1, described above. Further, a program for implementing the web server section 103 shown in FIG. 1, described above, is stored in the HDD 2004, and the web server section 103 is constituted by the CPU 2001 executing this program.

The operating section interface 2006 is for performing input and output to and from the operating section 108. For example, the operating section interface 2006 outputs image data to be displayed on the operating section 108 to the operating section 108, and transfers information which the user has inputted via the operating section 108 to the CPU 2001.

The network interface 2010 is connected to the LAN 100 to perform input and output of information to and from the LAN 2011. The network interface 2010 corresponds to the network connecting section 102 shown in FIG. 1, described above. The modem 2050 is connected to the WAN (the public circuit) 2051 to perform input and output of information to and from the WAN 2051.

The IC card slot 2100 permits input and output of a pass phrase (key information) which is used for encryption and decryption, by an IC card being inserted into the slot 2100 and then a suitable PIN (Personal Identification Number) code or the like being inputted.

The image bus interface 2005 is a bus bridge which connects the system bus 2007 to the image bus 2008 which transfers image data at high speed to convert the data structure.

The image bus 2008 has connected thereto a RIP (raster image processor) 2060, a device interface 2020, a scanner image processing section 2080, a printer image processing section 2090, an image rotation section 2030, an image compression section 2040, and an encryption/decryption processing section 2110.

The RIP 2060 expands a PDL (Page Description Language) code received from the LAN 100 into a bit map image. The device interface 2020 connects the image reading section 107 and the print output section 106 to the controller 104 to perform conversion of image data between synchronous data and non-synchronous data. The scanner image processing section 2080 performs correction, processing, editing and the like oh input image data. The printer image processing section 2090 performs printer correction, resolution conversion and the like on print output image data. The image rotation section 2030 performs rotation of the image data. The image compression section 2040 performs JPEG (Joint Photographic Coding Experts Group) compression and expansion processing on multi-valued image data, and performs JBIG (Joint Bi-lebel Image experts Group), MMR(Modified Modified Read), MH (Modified Huffman) or the like compression and expansion processing on two-valued image data.

The encryption/decryption processing section 2110 is a hardware accelerator board which performs encryption or decryption processing of data using a key provided via the IC card slot 2100.

Figure 3:
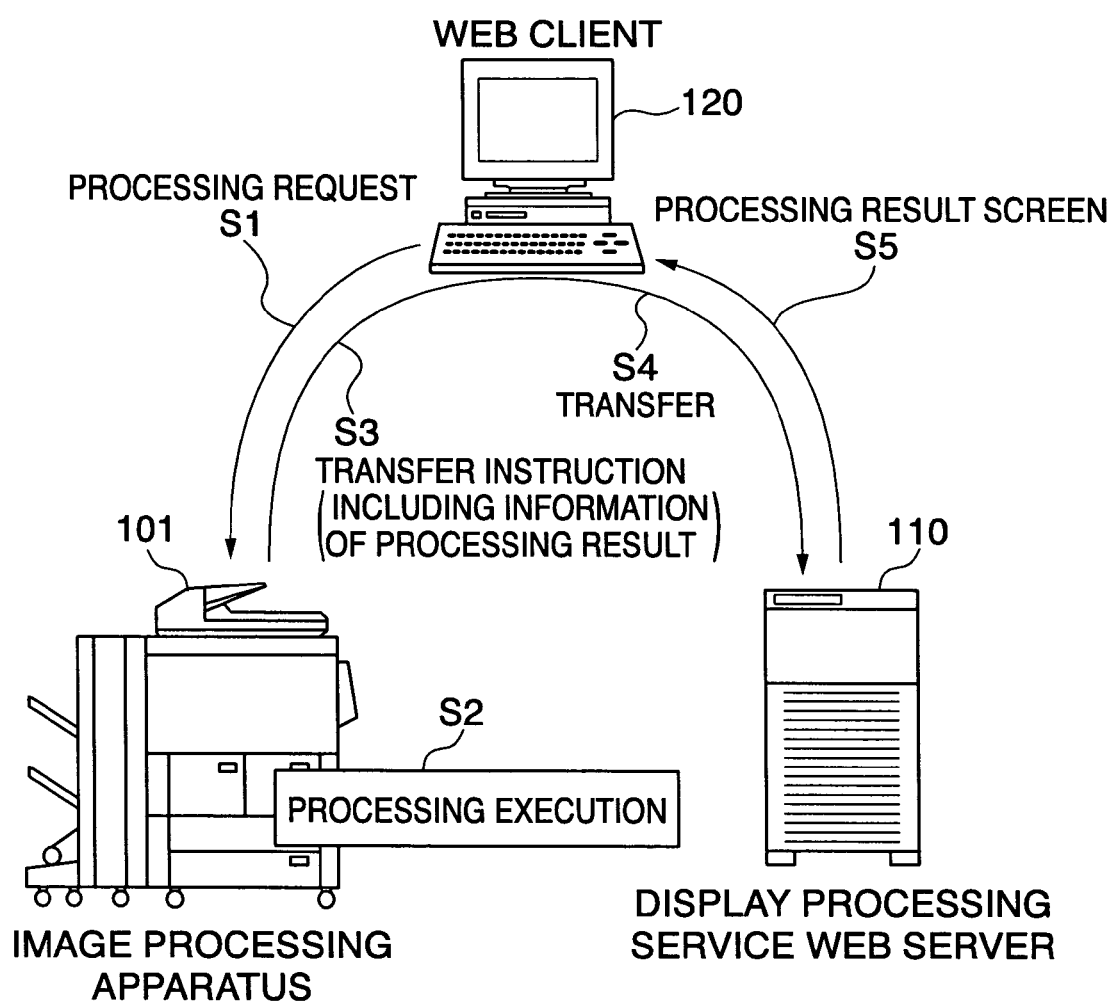
FIG. 3 is a diagram schematically showing the flow of processing carried out by the image processing system of FIG. 1.

Next, the flow of the processing in first embodiment of the present invention will be explained with reference to FIG. 3. FIG. 3 is a diagram schematically showing the flow of a process carried out by the image processing system of FIG. 1.

In FIG. 3, to access the image processing apparatus 101, the user of the web client 120 either inputs a URL (Uniform Resource Locator) of the image processing apparatus 101 directly to a web browser of the web client 120, or selects a link in which the URL is embedded. The web client 120 issues and sends an HTTP command which indicates the URL which has been inputted by the user via the network 100 to the image processing apparatus 101 (processing request S1). The web server section 103 of the image processing apparatus 101 receives and analyzes the HTTP command, and performs appropriate processing based on the results of the analysis (processing execution S2). The processing is performed by starting a CGI program. Upon being started, the CGI program receives a query parameter (query: processing request). This causes a value which has been designated by the user from the web client 120 on the transmitting side to be passed to the CGI program. According to requests from the user, the CGI program commands operations of acquiring and setting various types of information (e.g. apparatus information related to the paper size which can be selected by the image processing apparatus 101, the number of remaining sheets and the like; function information indicative of functions which can be executed by the image processing apparatus 101, such as a scan function and a copy function; status information indicative of the status of the image processing apparatus 101, such as "waiting" and "in use", maintenance information related to the status of maintenance of the image processing apparatus 101), performing print output, and so on.

When the processing by the web server section 103 has been completed, the image processing apparatus 101 sends redirect instruction information including the results of the processing to the web client 120 (transfer instruction S3). The web client 120 interprets the redirect instruction information, and makes a request to a URL of the transfer destination which has been instructed (transfer S4). According to the request from the web client 120, the display processing service web server 110 as the transfer destination sends data for display to the web client 120 (processing result display S5). The display processing service web server 110, which is a normal web server, can easily provide files to be used for display according to the user' intended uses or preferences.

Figures 4, 5:
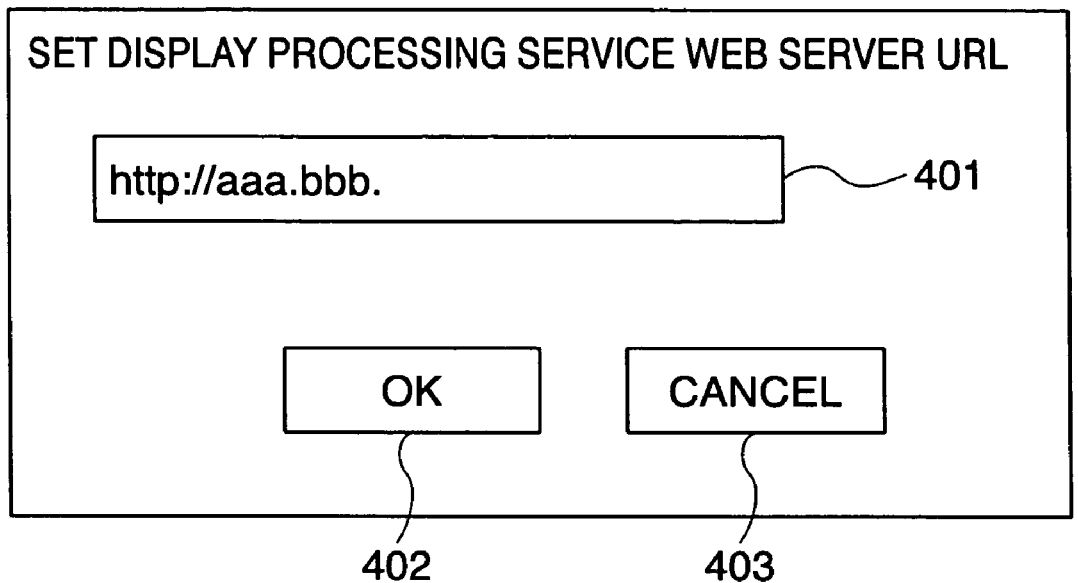
FIG. 4 is a diagram showing an example of a setting screen for setting a URL of a display processing service web server, which is displayed on an operating section of the image processing apparatus in FIG. 1.
FIG. 5 is a diagram showing an example of a table of a correspondence between processes requested for execution by a web client in FIG. 1 and transfer destinations for display processing, which is stored in a storage section of the image processing apparatus.
Figure 6:
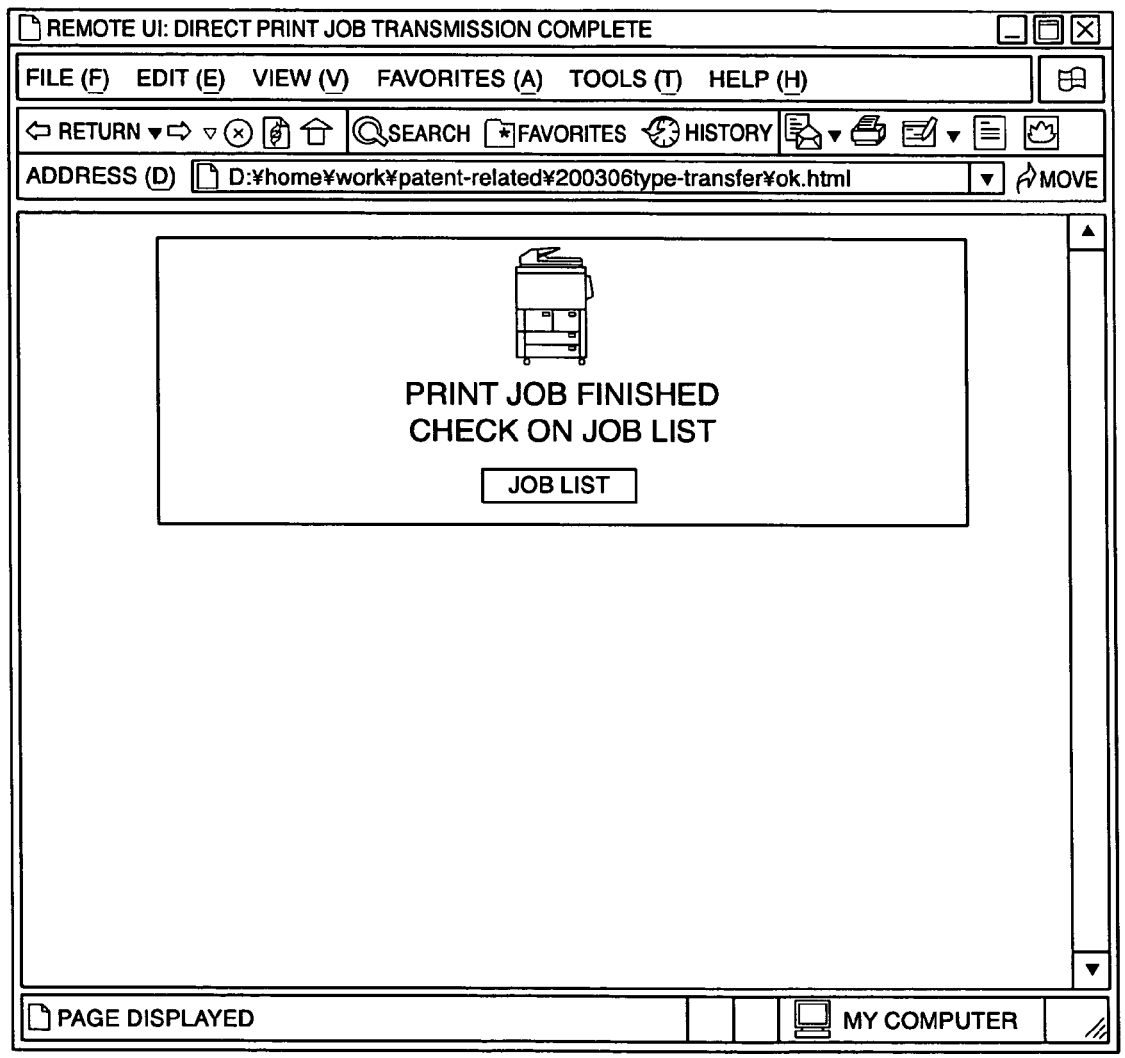
FIG. 6 is a diagram showing an example of a screen which is displayed on the web client when a print processing request has been performed normally.
Figure 7:
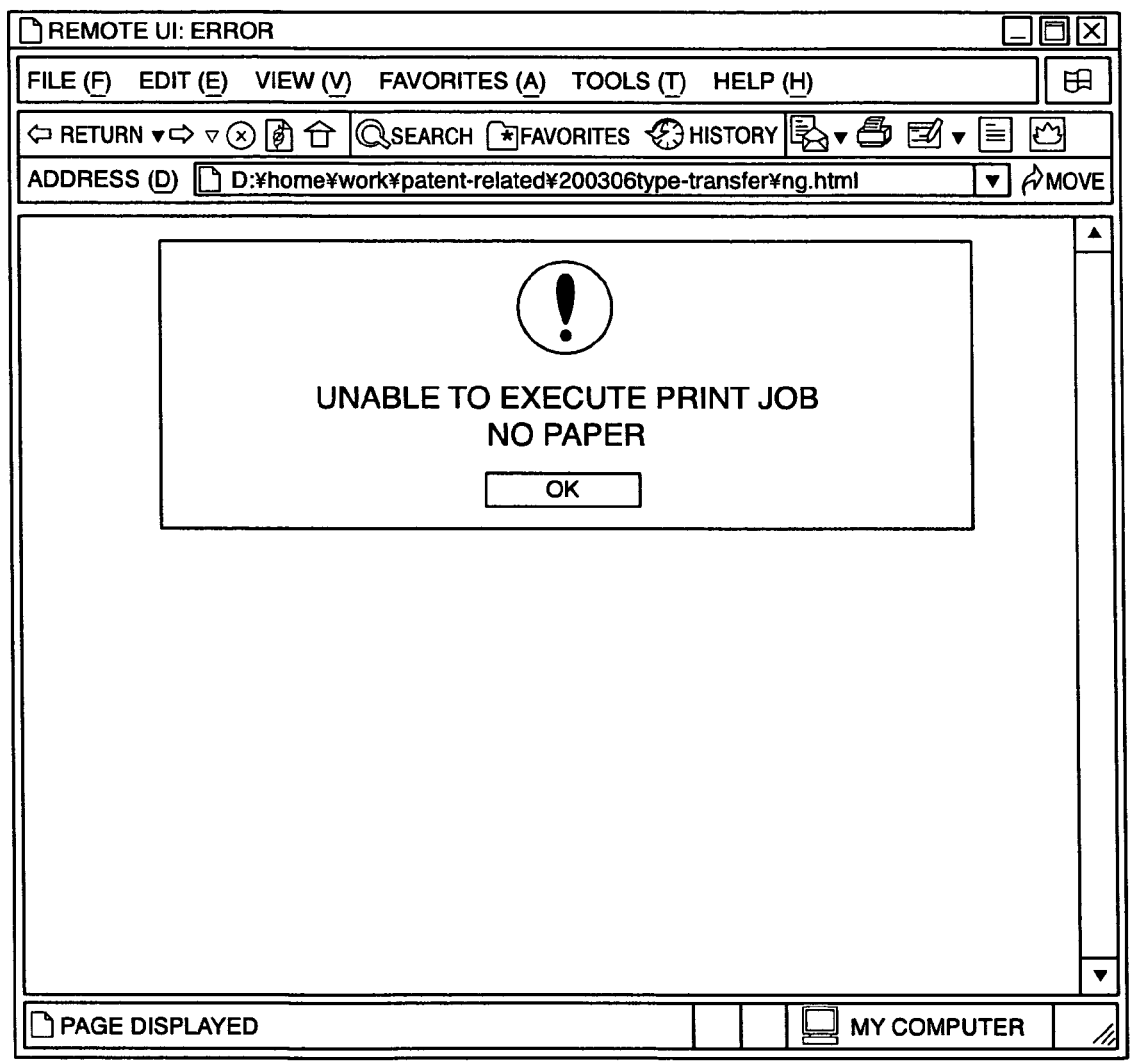
FIG. 7 is a diagram showing an example of a screen which is displayed on the web client when a print processing request has not been performed normally.

Next, the redirect instruction information which is transmitted from the image processing apparatus 101 to the web client 120 will be described with reference to FIGS. 4 through 7. FIG. 4 is a diagram showing an example of a setting screen for setting a URL of a display processing service web server, which is displayed on the operating section 108 of the image processing apparatus 101; FIG. 5 is a diagram showing an example of a table of a correspondence between processes requested for execution by the web client 120 and transfer destinations for display processing, which is stored in the storage section 105 of the image processing apparatus; FIG. 6 is a diagram showing an example of a screen which is displayed on the web client 120 when a print processing request has been performed normally; and FIG. 7 is a diagram showing an example of a screen which is displayed on the web client 120 when a print processing request has not been performed normally.

As shown in FIG. 4, a setting screen for setting the URL of the display processing service web server 110 is displayed on the operating section 108 of the image processing apparatus 101. In the setting screen, there are displayed a display field 401 for the URL of the display processing service web server 110, a confirm button 402 for confirming the contents which have been inputted, and a cancel button 403 for canceling the setting. In the illustrated setting screen example, in the display field 401, the URL of the display processing service web server 110 which is currently set is displayed. When the display field 401 is touched by the user, a screen for character input, not shown, is displayed, and the user can input a URL on the screen. When the confirm button 402 is pressed, the URL which is displayed in the display field 401 is stored in the storage section 105. When the cancel button 403 is pressed, then the URL which is displayed in the display field 401 is canceled.

Further, as shown in FIG. 5, a table of a correspondence between processes requested for execution by the web client 120 and transfer destinations for display processing is stored in the storage section 105 of the image processing apparatus 101. In the table of FIG. 5, it is shown that, when processing according to a print request "print.cgi" is made, the transfer destination for display processing is "print_result". Similarly, it is shown that the transfer destination is "send_result" when a request for transmitting processing "send.cgi" is accepted.

The image processing apparatus 101 determines the transfer destination URL for the redirect instruction information by combining the URL of the display processing service web server which has been designated on the setting screen of FIG. 4, the transfer destination which is obtained by referring to the correspondence table of FIG. 5, and the results of the execution of the processing which has been requested. For example, if the URL of the display processing service web server 110 is set as the transfer destination as shown in FIG. 4, then, upon receipt of a print request (request "print.cgi") from the web client 120, the image processing apparatus 101 performs print processing based on the print request, and sends redirect instruction information for "http://aaa.bbb/print_result?rc=OK" to the web client 120. Here, "rc=OK" is a parameter indicating that the print processing has been performed normally, and, if the print processing has not been performed normally, parameter indicating this fact is "rc=NG". The method of transferring the parameter indicating the processing result is determined in advance for each processing to be executed.

The redirect instruction is performed, for example, by sending a response with a META tag appended. Such a response with a META tag appended is one of transfer instruction methods that can be applied for the web client 120; for example, a header with a format as follows:

<META HTTP-EQUIV="Refresh;"
CONTENT=0;
URL=http://aaa.bbb/print_result?rc=ok"> may be included in the HTML header.

Here, "CONTENT=X" is for instructing to transfer the response in X seconds after the response has been received, while "URL=xxx" is for specifying the URL of the transfer destination.

Most web browsers which are generally in wide use, such as Internet Explorer (registered trademark) and Netscape Navigator (registered trademark), have the function of interpreting an instruction in HTML data including the above-mentioned header and automatically requesting a URL which has been designated, when they receive the HTML data.

In the above example, when the above-mentioned redirect instruction information arrives at the web client 120, it operates to request a print_result from the display processing service web server 110 (http://aaa.bbb/) immediately (after 0 seconds). At this time, a query parameter "rc=ok" is passed to the print_result of the display processing service web server 110. Then, the display processing service web server 110 transmits a response corresponding to the request from the web client 120. Here, the print_result is an item which has been prepared as a CGI program or a Servlet, so as to change the data which is transmitted to the web client 120 according to the value of rc. If the parameter "rc=ok" is passed to the print_result, then the screen shown in FIG. 6 is displayed on the web client 120, while, if the parameter "rc=ng" is passed to the print_result, then the screen shown in FIG. 7 is displayed on the web client 120.

The method of performing this redirect instruction may be a method using JavaScript (registered trademark), or a method using HTTP response code, or the like, apart from the above described method using a META tag. According to the method using JavaScript (registered trademark), a response which includes JavaScript (registered trademark) code in a format like the following is returned. The client which has received the response operates to make access to the URL which has been designated in the same manner as described above.

```
<html>
    <head>
        <SCRIPT LANGUAGE="JavaScript">
        function redirect( )
        {
            document.location.href="http://aaa.bbb/print_
            result?rc=ok";
        }
        </SCRIPT>
    </head>
    <body onLoad="redirect( )">
    </body>
</html>
```

Further, according to the method using HTTP response code, a HTTP response in a format like the following is transmitted as a response:

HTTP/1.1 302 Moved Temporarily
Location: http://aaa.bbb/print_resultrc=ok

When this type of response has been received, as well, the web client operates to access the URL which has been designated in the same manner as described above.

The redirect instruction methods of the types shown above are can be recognized by most web browsers which are in general use and enable the browsers to carry out processing according to the methods. Apart from these methods, any instruction method may be used insofar as it can be recognized by the web client and enables the web client to carry out processing according to the method.

Figure 8:
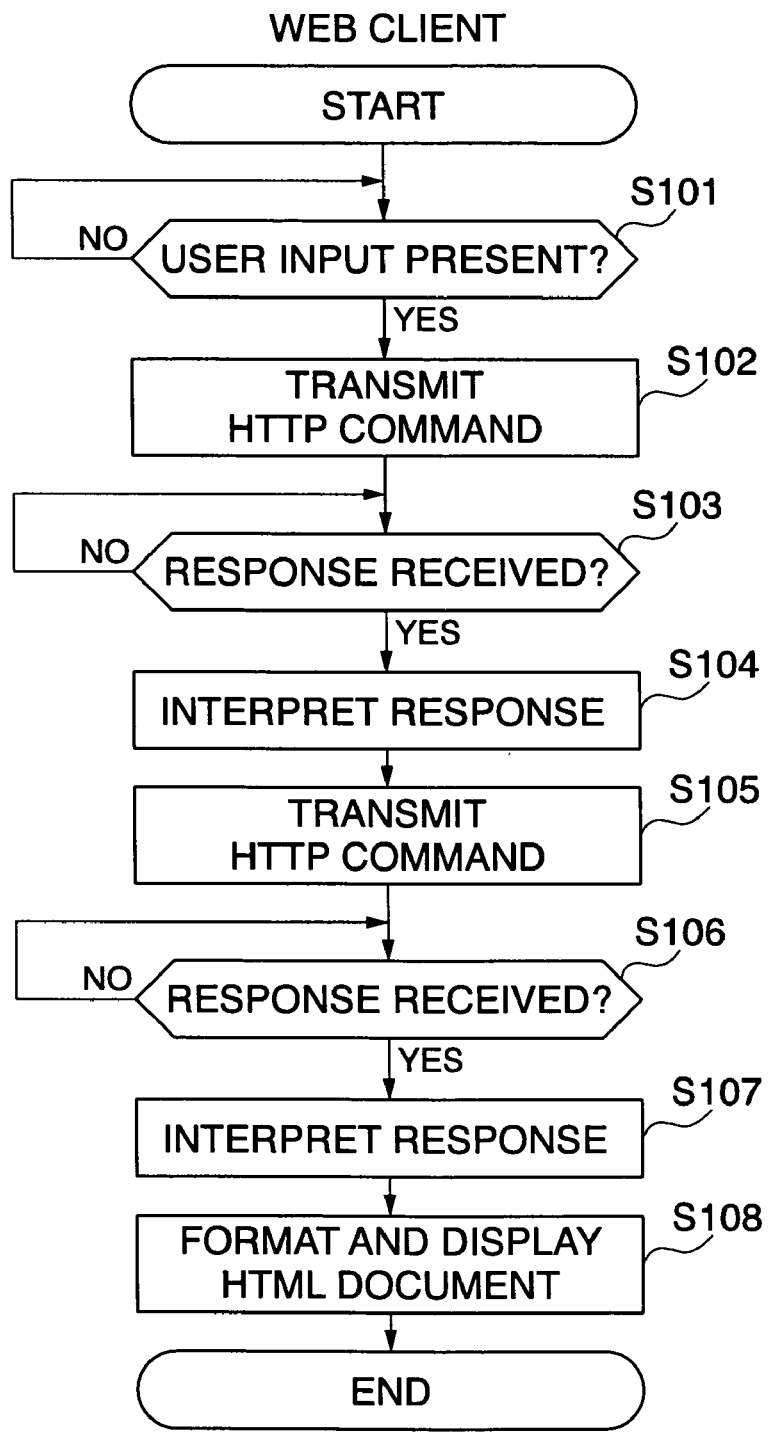
FIG. 8 is a flow chart showing the operation of the web client.
Figure 9:
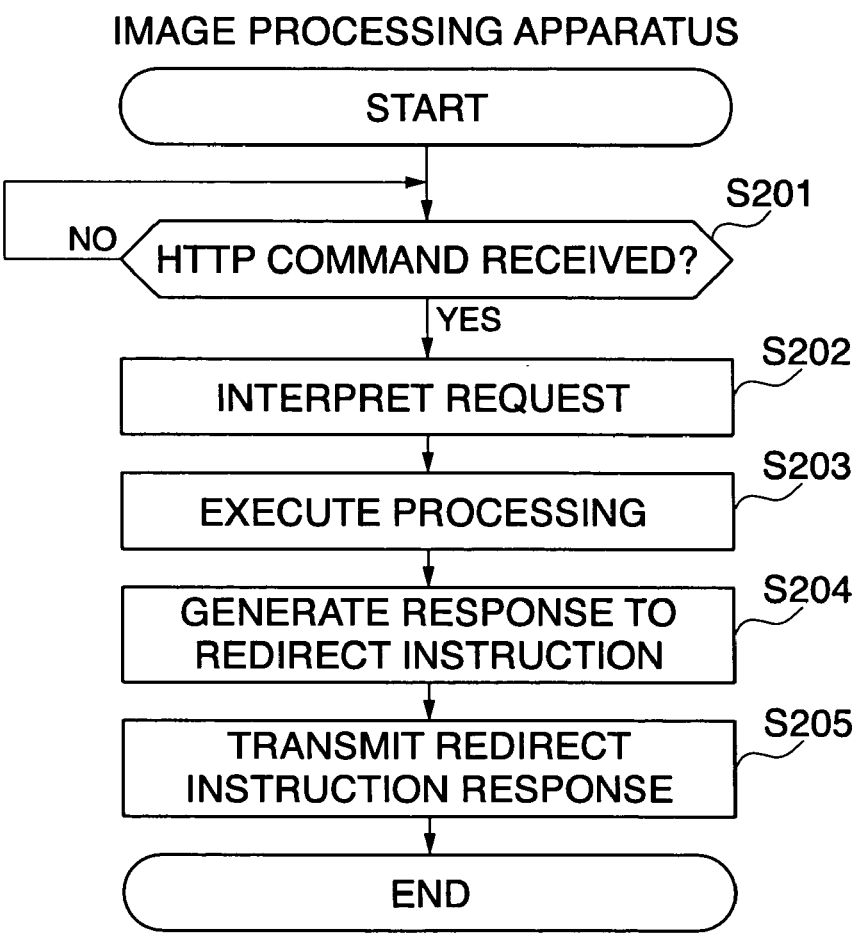
FIG. 9 is a flow chart showing the operation of the image processing apparatus.
Figure 10:
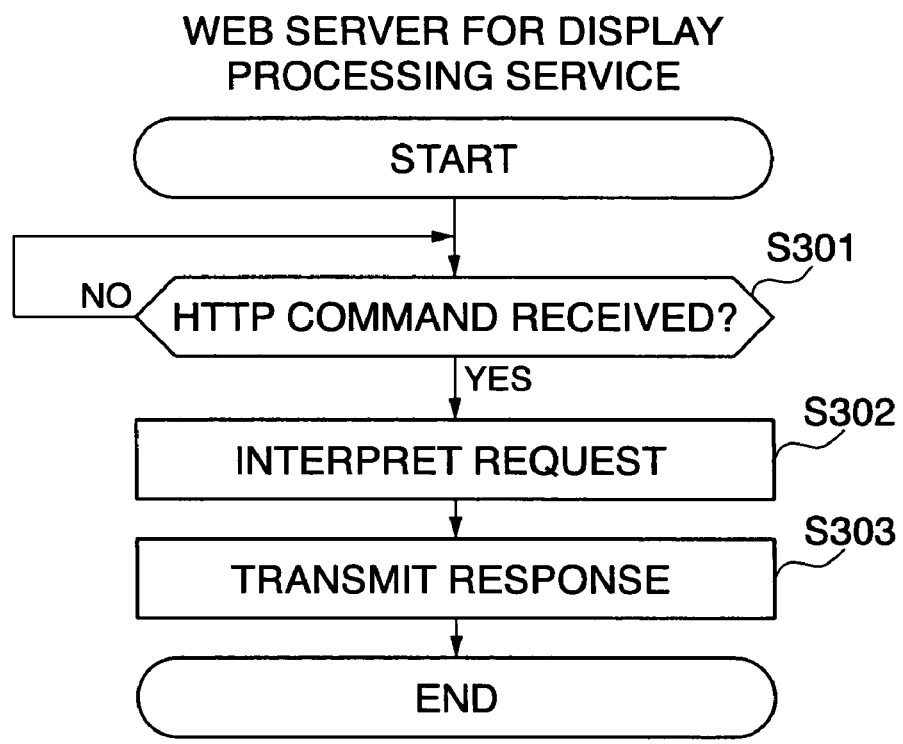
FIG. 10 is a flow chart showing the operation of a display processing service web server.

Next, the operations of each of the image processing apparatus 101, the web client 120, and the display processing service web server 110 will be described with reference to FIGS. 8 through 10. FIG. 8 is a flow chart showing the operation of the web client 120; FIG. 9 is a flow chart showing the operation of the image processing apparatus 101; and FIG. 10 is a flow chart showing the operation of the display processing service web server 110.

As shown in FIG. 8, the web client 120 waits for input from the user (step S101), and, upon input from the user, it transmits a HTTP command to the image processing apparatus 101 (step S102). Then, the web client 120 shifts into a waiting state for receiving a response from the image processing apparatus 101, and determines whether or not the response has been received (step S103).

As shown in FIG. 9, the image processing apparatus 101 is in a waiting state for receiving a HTTP command from the web client 120 (step S201), and, upon receipt of such a HTTP command from the web client 120, it interprets the request based on the HTTP command (step S202), and executes processing corresponding to the request (step S203). Next, the image processing apparatus 101 generates a response to the redirect instruction (step S204), and transmits the generated response to the web client 120 (step S205). Then, the process is terminated.

As shown in FIG. 8, when the web client 120, which is in the waiting state for receiving a response from the image processing apparatus 101, receives the response from the image processing apparatus 101 (YES to the step S103), then it interprets the received response (step S104). Here, since the received response is a redirect instruction, the web client 120 transmits an HTTP command to the transfer destination of the redirect instruction which is included in the response (step S105). Here, the transfer destination of the redirect instruction is the display processing service web server 110. Then, the web client 120 shifts into a waiting state for receiving response. from the display processing service web server 110, and determines whether or not the response has been received (step S106).

As shown in FIG. 10, the display processing service web server 110 is in a waiting state for receiving a HTTP command from the web client 120 (step S301), and when such a HTTP command is received from the web client 120, it interprets the request based on the HTTP command (step S302). Then, the display processing service web server 110 transmits a response corresponding to the request to the web client 120 (step S303), and then the process is terminated.

As shown in FIG. 8, when the web client 120, which is in a waiting state for receiving a response from the display processing service web server 110, receives the response from the display processing service web server 110 (YES to a step S106), then it interprets the received response (step S107), and formats a HTML file which it has received and displays the formatted HTML file on the display screen of the web client 120 (step S108), and then the process is terminated. It should be noted that in the above step S108, if there is link to an image file or the like within-the data which has been received, processing for obtaining and displaying the file is performed.

Figure 13:
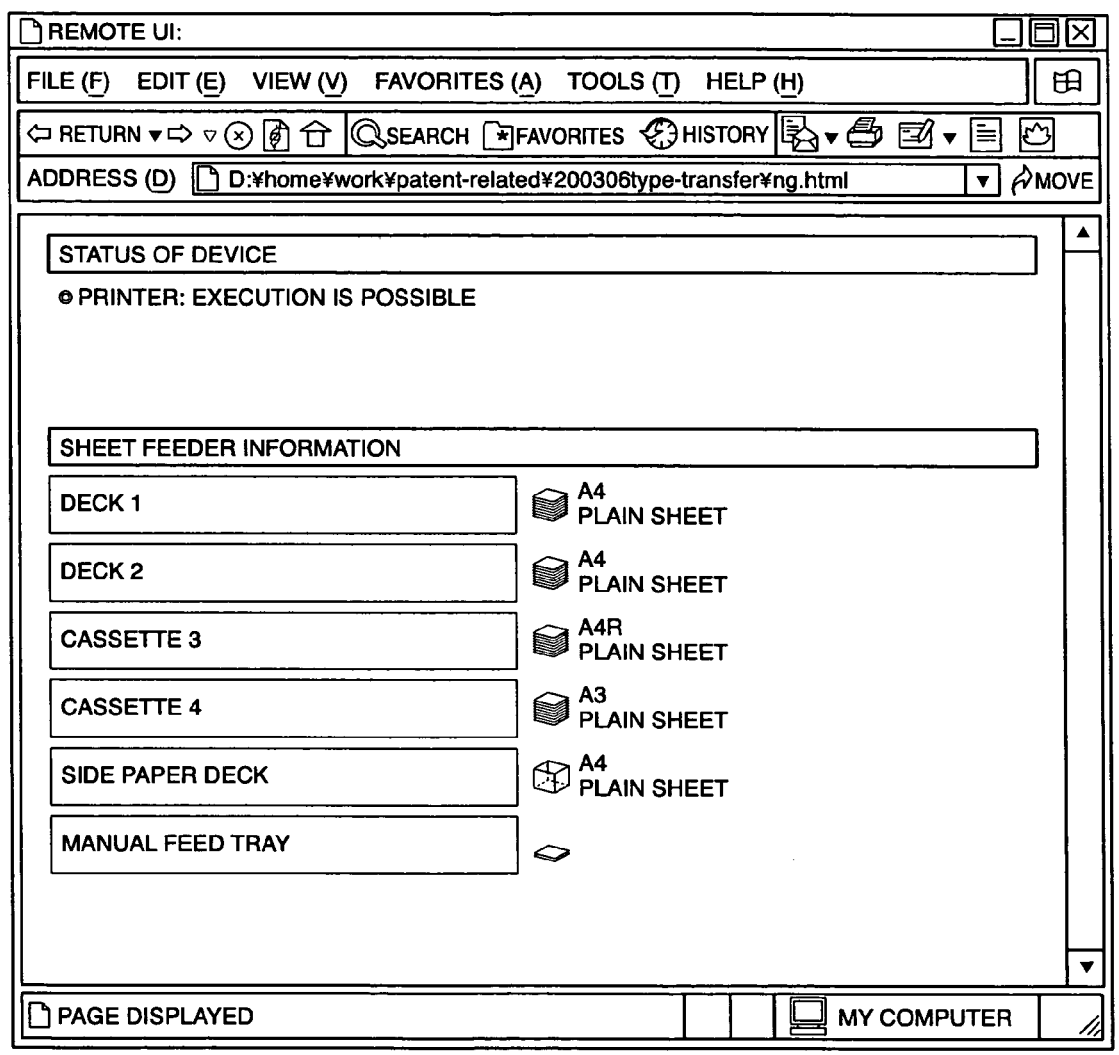
FIG. 13 is a diagram showing an example of a screen displayed on the web client indicating that no sheet remains in a side paper deck.

In the case where the display screen is not customized, if the user wishes to display on the display screen the presence or absence and the remaining number of sheets in each of sheet feeder cassettes of the image processing apparatus 101, for example, the web client 120 displays only the presence or absence and the remaining number of in each sheet feeder cassette according to a response from the display processing service web server 110, as shown in FIG. 13. The illustrated example in FIG. 13 shows that there is no sheet remaining in a side paper deck.

Figure 14:
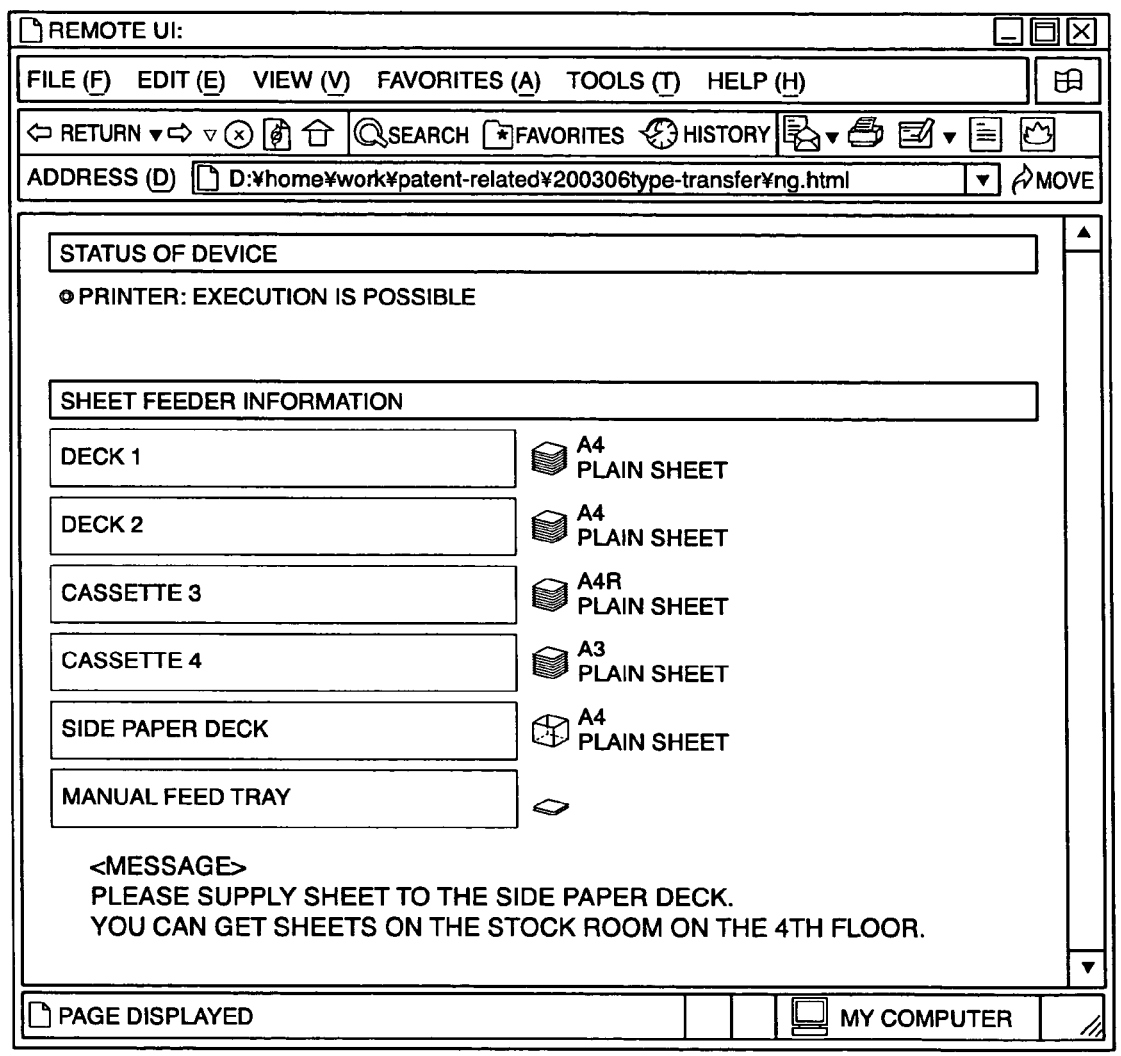
FIG. 14 is a diagram showing the screen of FIG. 13 with an example of a customized message.

On the other hand, in the case where the display screen is customized, as shown in FIG. 14, a message "Please supply sheets to the side paper deck. You can get sheets on the stock room on the 4th floor" or a message "There is no OHP sheet. Please ask Mr. xxx of yyy Section to supply OHP sheets" is displayed together with the above-mentioned display contents in FIG. 13.

In this case, parameters indicative of the presence or absence of sheets and the remaining number of sheets in each sheet feeder cassette of the image processing apparatus 101 are attached to the destination URL of the redirection instruction information transmitted to the display processing service web server 110.

Further, the display processing service web server 110 stores therein a CGI program for changing the contents of information for display to be transmitted to the web client 120 based on the parameters indicative of the presence or absence of sheets and the remaining number of sheets in each sheet feeder cassette of the image processing apparatus 101.

As described above, even if the image processing apparatus 101 sends a response indicative of the same result of processing corresponding to an operating request from the web client 120, if a HTML file (information for display) which is transmitted to the web client 120 from the display processing service web server 110 is changed, it is possible to change the information which is displayed on the web client 120. As a result, it is possible to easily customize the user interface according to the user's intended use, preference and/or the like.

Figure 11:
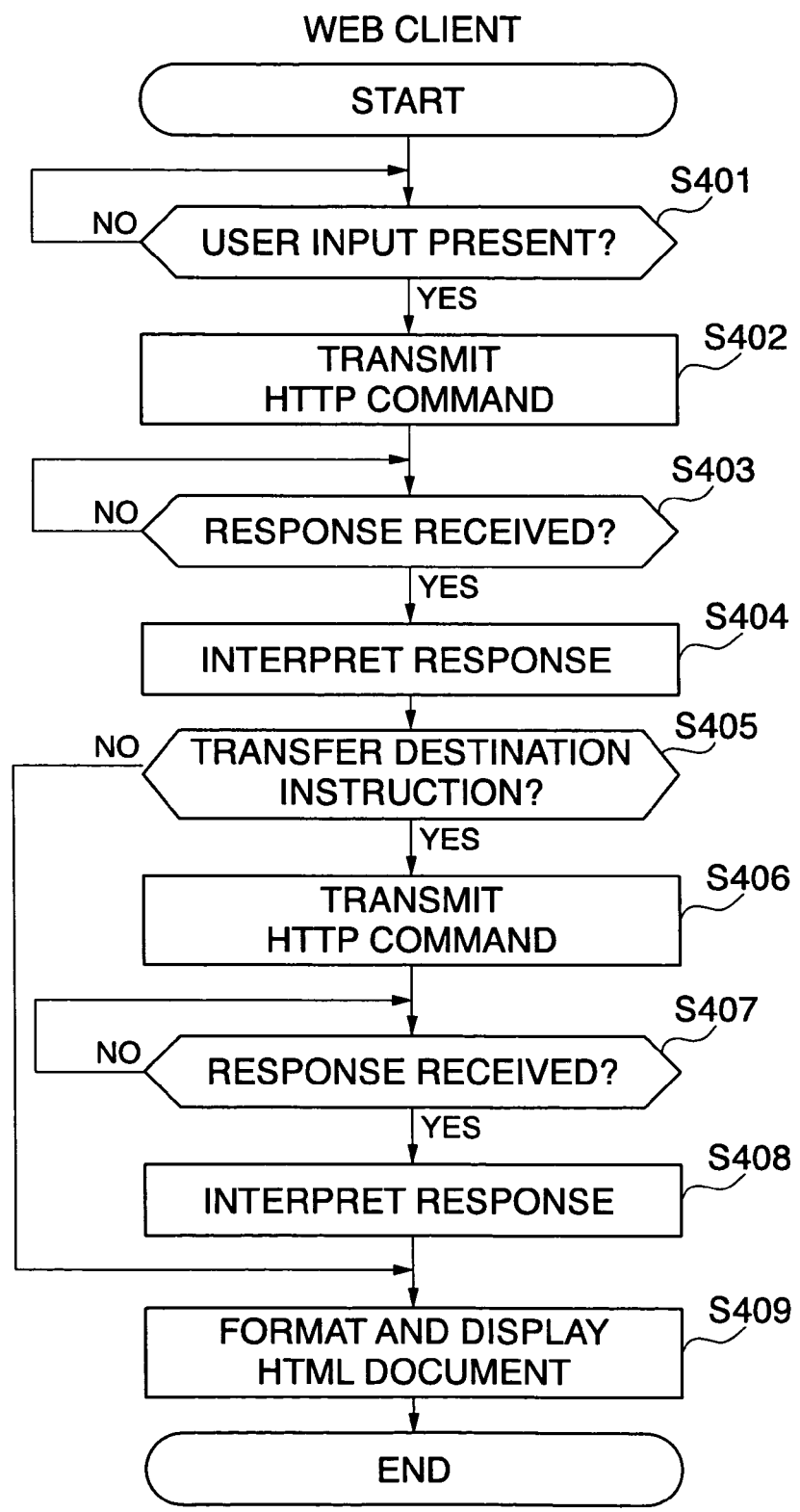
FIG. 11 is a flow chart showing the operation of a web client of an image processing system according to a second embodiment of the present invention.
Figure 12:
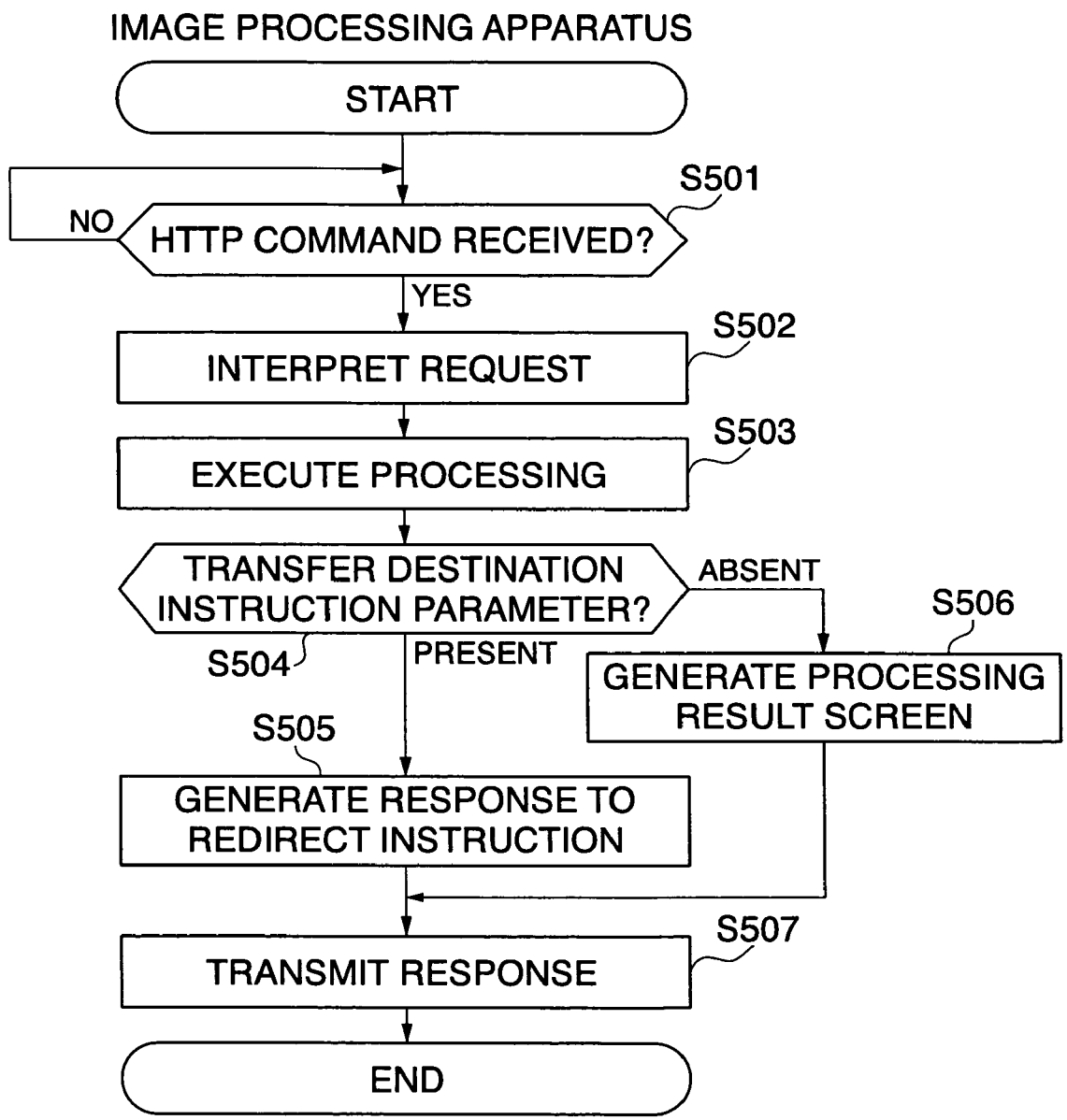
FIG. 12 is a flow chart showing the operation of an image processing apparatus of the image processing system according to the second embodiment.

Next, a second embodiment of the present invention will be described with reference to FIGS. 11 and 12. FIG. 11 is a flow chart showing the operation of a web client 120 of an image processing system according to the second embodiment, and FIG. 12 is a flow chart showing the operation of an image processing apparatus 101 of this image processing system according to the second embodiment.

In the present embodiment, the image processing system has the same arrangement as that of the image processing system in the above described first preferred embodiment, the explanation detailed description thereof will be is omitted. Further, in the following explanation description, corresponding elements to those in the first embodiment are designated b identical references.

In the above described first preferred embodiment described above, the means for setting the URL of the display processing service web server 110 is provided in the image processing apparatus 101, and the web client 120 was is constructed so as to transmit the redirect instruction to the URL which has been set by the image processing apparatus 101. By contrast, in this second preferred the present embodiment of the present invention, the structure is such that it is configured such that the web client 120 is constructed to transfers the URL of the display processing service web server 110 is transferred to the image processing apparatus 101 as one parameter of a processing request from the web client 120.

The parameter of the processing request from the web client 120 in the present embodiment consists of, for example, a URL as follows:

http://ccc.ddd/print_cgi?redirect_url=http://aaa.bbb/print_ result

Here, "http://ccc.ddd/print.cgi" indicates a designation for making a print request to the image processing apparatus 101. "redirect_url=http://aaa.bbb/print_result" is a query parameter for passing the URL which specifies the transfer destination for performing response display processing in response to the print request. Upon receipt of the print request, the image processing apparatus 101 performs corresponding processing (in this case, the printing process) and transmits redirect instruction information, as a response, to the URL (in this case, "http://aaa.bbb/print_result") which is designated by "redirect_url".

The image processing apparatus 101 is constructed to be also able to transmit a screen showing the result of processing by the image processing apparatus 101 as HTML data, in response to the processing request from the web client 120. Upon receipt of a request from the web client 120, the image processing apparatus 101 determines whether or not a parameter "redirect_url" is included in the received request, and, if the parameter "redirect_url" is included, then the image processing apparatus 101 transmits, as a response, redirect instruction information to the URL which is designated by "redirect_url"; while, if this parameter is not included, then the image processing apparatus 101 transmits a processing result screen of its own as a response, instead of redirection instruction information.

Next, the operations of the image processing apparatus 101, the web client 120, and the display processing service web server 110 of the present embodiment will be described with reference to FIGS. 11 and 12. Here, the operation of the display processing service web server 110 is the same as that in the first embodiment described above with reference to FIG. 10, no flow chart showing the operation will be shown.

As shown in FIG. 11, the web client 120 waits for input from the user (step S401), and, when there is input from the user, the web client 120 transmits a HTTP command to the image processing apparatus 101 (step S402). The web client 120 shifts into a waiting state for receiving a response from the image processing apparatus 101, and determines whether or not such the response has been received (step S403).

As shown in FIG. 12, the image processing apparatus 101 is in a waiting state for receiving a HTTP command from the web client 120 (step S501), and then, when it receives a HTTP command from the web client 120, it interprets the request (step S502), and executes processing corresponding to the request (step S503). The image processing apparatus 101 determines whether or not a transfer destination instruction parameter is appended to the request from the web client 120 (step S504). If a transfer destination instruction parameter is appended (YES to the step S504), the image processing apparatus 101 generates redirect instruction information (step S505), and transmits the redirect instruction information to the web client 120 (step S507). Then, the process is terminated.

On the other hand, if no transfer destination instruction parameter is appended (NO to the step S504), then the image processing apparatus 101 generates data indicative of a processing result screen (step S506), and transmits the data indicative of the processing. result screen to the web client 120 (step S507). Then, the process is terminated.

As shown in FIG. 11, when the web client 120, which is waiting for receipt of a response from the image processing apparatus 101, receives a response from the image processing apparatus 101 (YES to a step S403), then the web client 120 interprets the received response (step S404), and determines whether or not the received response is a redirect instruction (step S405). If the received response is not a redirect instruction (NO to the step S405), in other words, if it is data indicative of a processing result screen, the web client 120 formats and displays on its display screen the received data (step S409), and then the process is terminated.

On the other hand, if the received response is a redirect instruction (YES to the step S405), then the web client 120 transmits a HTTP command to the transfer destination of the redirect instruction which is included in the received response, in other words, to the display processing service web server 110 (step S406). Then, the web client 120 shifts into a waiting state for receiving a response from the display processing service web server 110, and determines whether or not the response has been received (step S407).

When the display processing service web server 110 receives the HTTP command from the web client 120 according to the procedure shown in the flow chart of FIG. 10, it interprets the request based on the HTTP command, and transmits a response corresponding to the request to the web client 120. Then, the process is terminated.

As shown in FIG. 11, when the web client 120, which is waiting for receipt of a response from the display processing service web server 110, receives a response from the display processing service web server 110 (YES to the step S407), then the web client 120 interprets the received response (step S408), and formats a HTML file which it has received and displays the formatted HTML file on the display screen of the web client 120 (step S409), and then the process is terminated. It should be noted that, in the above step S408, if there are links to image files or the like within the data which has been received, processing obtaining and displaying these files is performed.

As described above, according to present embodiment, for a user who wishes to customize the user interface on the web client 120, the display processing service web server 110 is prepared, a request to which is appended a parameter which specifies the display processing service web server as the transfer destination of a redirect instruction is transmitted from the web client 120 to the image processing apparatus 101, whereby it becomes possible for the user to customize the user interface on the web client 120. Further, there is the advantage that for a user for whom this type of customization is not necessary (i.e., a user for whom the standard processing result screen which the image processing apparatus 101 provides by default is satisfactory), there is no need to prepare the display processing service web server 110.

Furthermore, even if the same request is made to the image processing apparatus 101, the URL of the transfer destination of the redirect instruction can be designated in response to each request from a web client, whereby it is possible to customize the processing result display screen for each web client. In this case, it is assumed, for example, that a CGI program (print_result_ja) which displays the processing results in the Japanese language, and also a CGI program (print_result_en) which displays the processing results in the English language are prepared on the display processing service web server 110.

And, if there is a request:

http://ccc.ddd/print.cgi?redirect_url=http://aaa.bbb/print_result_ja from a first web client, then a processing result screen in the Japanese language is displayed on the first web client. By contrast, if there is a request:

http://ccc.ddd/print.cgi?redirect_url=http://aaa.bbb/print_result_en from the second web client, then a processing result screen in the English language is displayed on the second web client.

Although in the above described embodiments, the image processing apparatus 101, the web client 120, and the display processing service web server 110 are connected to one another via the same LAN 100, alternatively the image processing apparatus 101 and the display processing service web server 110 may be arranged in other ways insofar as both can be accessed from the web client 120, since actually the image processing apparatus 101 and the display processing service web server 110 do not communicate directly with each other, and accordingly it is not absolutely essential to provide the image processing apparatus 101 and the web server 110 under the same LAN environment. Thus, for example, it goes without saying that the display processing service web server 110 may be provided on the internet.

It is to be understood that the object of the present invention may also be accomplished by supplying a system or an apparatus with a storage medium in which a program code of software which realizes the functions of either of the above described embodiments is stored, and causing a computer (or CPU or MPU or the like) of the system or apparatus to read out and execute the program code stored in the storage medium.

In this case, the program code itself read out from the storage medium realizes the new functions of the present invention described above, and hence the program and the storage medium in which the program code is stored constitute the present invention.

Examples of the storage medium for supplying the program code include a floppy (registered trademark) disk, a hard disk, an optical disk, a magneto-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program may be downloaded via a network from another computer, a database or the like, not shown, connected to the Internet, a commercial network, a local area network, or the like.

Further, the functions of either of the above-described embodiments may be accomplished not only by executing a program code read out by a computer, but also by causing an operating system (OS) or the like which operates on the computer to perform a part or all of the actual operations based on instructions of the program code.

Further, it is to be understood that the functions of the above-described embodiments may be accomplished not only by executing a program code read out by a computer, but also by causing an OS (operating system) or the like which operates on the computer to perform a part or all of the actual operations based on instructions of the program code.

Further, it is to be understood that the functions of either of the above described embodiments may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

CROSS REFERENCE TO RELATED APPLICATION

This application claims priority from Japanese Patent Application No. 2003-392378 filed Nov. 21, 2003, which is hereby incorporated by reference herein.

What is claimed is:

1. An image processing system, comprising:
   an image processing apparatus;
   a display processing service apparatus; and
   at least one client that is connected to at least said image processing apparatus and said display processing service apparatus for communication therewith,
   wherein said image processing apparatus comprises a processing unit operable when receiving an operating request from said client, to perform processing corresponding to the received operating request, and a first transmission unit that transmits to said client a redirect instruction containing an address information corresponding to the operating request received from said client for commanding access to said display processing service apparatus as a response to the operating request,
   wherein said client comprises an access unit operable when receiving the redirect instruction from said image processing apparatus, to access said display processing service apparatus according to the address information contained in the received redirect instruction,
   wherein said display processing service apparatus comprises a second transmission unit operable when being accessed from said client according to the address information contained in the redirect instruction, to transmit information corresponding to the address information to said client,
   wherein said client includes a display unit that displays the information transmitted from the second transmission unit;
   wherein the redirect instruction includes the result of the processing corresponding to the operating request received by said image processing apparatus; and
   wherein said display processing service apparatus further includes a display information storage unit that stores a plurality of items of information for display, and said display processing service apparatus reads out information for display from said display information storage unit according to the result of the processing corresponding to the operating request received by said image processing apparatus included in the redirect instruction, and transmits the read out information for display to said client.

2. An image processing system according to claim 1, wherein said image processing apparatus comprises an address information storage unit that stores address information of said display processing service apparatus, and the address information stored in said address information storage unit is to be contained in the redirect instruction.

3. An image processing system according to claim 1, wherein said client is capable of transmitting address information of said display processing service apparatus along with the operating request when transmitting the operating request to said image processing apparatus, and said image processing apparatus is operable when receiving the address information transmitted along with the operating request from said client, to cause said first transmission unit to transmit the redirect instruction including the received address information to said client.

4. An image processing system according to claim 3, wherein said image processing apparatus comprises a screen display information storage unit that stores screen information for display corresponding to the operating request from said client, and said image processing apparatus is operable when not receiving the address information of said display processing service apparatus along with the operating request from said client, to cause said second transmission unit to transmit to said client the screen information for display according to the operating request from said client stored in said screen display information storage unit, instead of the redirect instruction.

5. An image processing method applied to an image processing system which comprises an image processing apparatus, at least one client having a display unit, and a display processing service apparatus, and in which the client is connected to at least the image processing apparatus and the display processing service apparatus for communication therewith, comprising the steps of:
   performing processing corresponding to an operating request from the client by the image processing apparatus when the operating request from the client is received by the image processing apparatus;
   transmitting a redirect instruction containing an address information corresponding to the operating request received from the client for commanding access to the display processing service apparatus as a response to the operating request from the image processing apparatus to the client;
   accessing the display processing service apparatus according to the address information contained in the redirect instruction by the client when the redirect instruction from the image processing apparatus is received by the client; and
   transmitting information corresponding to the address information when the display processing service apparatus is accessed from the client according to the address information contained in the redirect instruction,
   wherein the information corresponding to the address information transmitted in the transmitting information step is displayed in the display unit;
   wherein the redirect instruction includes the result of the processing corresponding to the operating request received by the image processing apparatus, and wherein the display processing service apparatus comprises a display information storage unit that stores a plurality of items of information for display, and the display processing service apparatus reads out information for display from the display information storage unit according to the result of the processing corresponding to the operating request received by the image processing apparatus included in the redirect instruction, and transmits the read out information for display to the client.

6. An image processing method according to claim 5, wherein the image processing apparatus comprises an address information storage unit that stores address information of the display processing service apparatus, and the address information stored in the address information storage unit is to be contained in the redirect instruction.

7. An image processing method according to claim 5, wherein the client is capable of transmitting address information of the display processing service apparatus along with the operating request when transmitting the operating request to the image processing apparatus, and the image processing apparatus is operable when receiving the address information transmitted along with the operating request from the client, to transmit the redirect instruction including the received address information to the client.

8. An image processing method according to claim 7, wherein the image processing apparatus comprises a screen display information storage unit that stores screen information for display corresponding to the operating request from the client, and the image processing apparatus is operable when not receiving the address information of the display processing service apparatus along with the operating request from the client, to transmit to the client the screen information for display according to the operating request from the client stored in the screen display information storage unit, instead of the redirect instruction.

9. A computer-readable storage medium storing a computer program executable by a computer to perform an image processing method applied to an image processing system which comprises an image processing apparatus, at least one client having a display unit, and a display processing service apparatus, and in which the client is connected to at least the image processing apparatus and the display processing service apparatus for communication therewith, the method comprising the steps of:

performing processing corresponding to an operating request from the client by the image processing apparatus when the operating request from the client is received by the image processing apparatus;

transmitting a redirect instruction containing an address information corresponding to the operating request received from the client for commanding access to the display processing service apparatus as a response to the operating request from the image processing apparatus to the client;

accessing the display processing service apparatus according to the address information contained in the redirect instruction by the client when the redirect instruction from the image processing apparatus is received by the client; and transmitting information corresponding to the address information when the display processing service apparatus is accessed from the client according to the address information contained in the redirect instruction, wherein the information corresponding to the address information transmitted in the transmitting information step is displayed in the display unit;

wherein the redirect instruction includes the result of the processing corresponding to the operating request received by the image processing apparatus, and wherein the display processing service apparatus comprises a display information storage unit that stores a plurality of items of information for display, and the display processing service apparatus reads out information for display from the display information storage unit according to the result of the processing corresponding to the operating request received by the image processing apparatus included in the redirect instruction, and transmits the read out information for display to the client.

* * * * *